United States Patent
Jeon et al.

(10) Patent No.: US 12,192,516 B2
(45) Date of Patent: Jan. 7, 2025

(54) VIDEO ENCODING AND DECODING METHOD AND APPARATUS USING SELECTIVE SUBBLOCK SPLIT INFORMATION SIGNALING

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Jee Yoon Park, Seoul (KR); Bum Yoon Kim, Yongin-si (KR); Seung Wook Park, Yongin-si (KR)

(73) Assignees: HYUNDAI MOTOR COMPANY, Seoul (KR); KIA CORPORATION, Seoul (KR); RESEARCH &BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 85 days.

(21) Appl. No.: 18/198,061

(22) Filed: May 16, 2023

(65) Prior Publication Data

US 2023/0291928 A1 Sep. 14, 2023

Related U.S. Application Data

(63) Continuation of application No. PCT/KR2021/017261, filed on Nov. 23, 2021.

(30) Foreign Application Priority Data

Nov. 23, 2020 (KR) .......................... 10-2020-0157793
Nov. 23, 2021 (KR) .......................... 10-2021-0161995

(51) Int. Cl.
*H04N 19/593* (2014.01)
*H04N 19/103* (2014.01)
(Continued)

(52) U.S. Cl.
CPC ......... *H04N 19/593* (2014.11); *H04N 19/103* (2014.11); *H04N 19/105* (2014.11); *H04N 19/176* (2014.11)

(58) Field of Classification Search
CPC .......................... H04N 19/593; H04N 19/176
See application file for complete search history.

(56) References Cited

U.S. PATENT DOCUMENTS

| 10,652,536 B2 | 5/2020 | Lim et al. |
|---|---|---|
| 11,297,309 B2 | 4/2022 | Kim |

(Continued)

FOREIGN PATENT DOCUMENTS

| KR | 20190042090 A | 4/2019 |
|---|---|---|
| KR | 20190062585 A | 6/2019 |

(Continued)

*Primary Examiner* — Kyle M Lotfi
(74) *Attorney, Agent, or Firm* — Lempia Summerfield Katz LLC

(57) ABSTRACT

Disclosed is a video encoding/decoding method and an apparatus using selective transmission of subblock partitioning information. The video encoding/decoding method and apparatus selectively encode and decode the splitting direction of a subblock to reduce the overhead of signal transmission for using subblock partitioning while effectively performing intra prediction per subblock basis.

13 Claims, 19 Drawing Sheets

(51) Int. Cl.
*H04N 19/105* (2014.01)
*H04N 19/176* (2014.01)

(56) References Cited

U.S. PATENT DOCUMENTS

| | | | |
|---|---|---|---|
| 11,350,091 | B2 | 5/2022 | Lim et al. |
| 11,570,436 | B2 | 1/2023 | Lee |
| 2019/0342550 | A1 | 11/2019 | Lim et al. |
| 2020/0036985 | A1 | 1/2020 | Jang et al. |
| 2020/0236358 | A1 | 7/2020 | Lim et al. |
| 2021/0006778 | A1 | 1/2021 | Kim |
| 2021/0360240 | A1 | 11/2021 | Lee |
| 2021/0392371 | A1* | 12/2021 | Lee .................. H04N 19/12 |
| 2021/0409765 | A1* | 12/2021 | De Luxan Hernandez ................. H04N 19/172 |
| 2022/0150488 | A1 | 5/2022 | Lim et al. |
| 2022/0182602 | A1 | 6/2022 | Kim |
| 2022/0191530 | A1 | 6/2022 | Sim et al. |

FOREIGN PATENT DOCUMENTS

| | | |
|---|---|---|
| KR | 20200013766 A | 2/2020 |
| KR | 20200093468 A | 8/2020 |
| KR | 20200110214 A | 9/2020 |

\* cited by examiner

VIDEO ENCODING AND DECODING METHOD AND APPARATUS USING SELECTIVE SUBBLOCK SPLIT INFORMATION SIGNALING

CROSS-REFERENCE TO RELATED APPLICATIONS

This application is a Continuation of Interactional Application No. PCT/KR2021/017261 filed on Nov. 23, 2021, which claims priority to Korean Patent Application No. 10-2020-0157793 filed on Nov. 23, 2020, and Korean Patent Application No. 10-2021-0161995 filed on Nov. 23, 2021, the entire disclosures of which are incorporated herein by reference.

TECHNICAL FIELD

The present disclosure relates to a video encoding/decoding method and an apparatus using selective transmission of subblock partitioning information.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In image (video) encoding, when an image is split into on a per CU (Coding Unit) and encoded on a per CU, all pixels in a block to be encoded are intra predicted using one prediction mode. Since the distance between pixels and the reference pixels may become farther, a large amount of energy may remain in residual signals to be encoded. The problem of remaining energy in the residual signals may become more severe for a horizontally (or vertically) long rectangular block for which the distance between a pixel to be predicted and the reference pixel is long or when the size of the block is large. The block may be split further to solve the problem, but it leads to another problem of increasing the overhead for transmitting an intra prediction mode for each subdivided block.

Meanwhile, another solution is also at hand for addressing the problem of increasing overhead. The prior art performs prediction by splitting a block to be encoded one more time into evenly split smaller blocks to reduce the overhead while improving intra prediction efficiency but transmits only a single prediction mode on a per original block before subpartitioning and applies the single prediction mode commonly for subpartitioned small blocks. The background described above is called Intra Sub-Partition (ISP) technique.

When ISP is applied for intra prediction of a current block, the video encoding and decoding apparatus may signal one intra prediction mode while predicting subpartitioned blocks using reference pixel values close to the respective subpartitioned blocks. On the other hand, a problem arises when the ISP technique is applied in that the information indicating subpartitioning is always transmitted together with the information indicating the ISP mode. Therefore, a method for effectively coding the information indicating subpartitioning needs to be considered in terms of coding efficiency.

SUMMARY

The present disclosure in some embodiments seeks to provide a video encoding/decoding method and an apparatus for selectively encoding and decoding a splitting direction of a subblock. The video encoding/decoding method and apparatus reduce the overhead of signal transmission for using subblock partitioning while effectively performing intra prediction per subblock basis.

At least one aspect of the present disclosure provides an intra prediction method for applying an intra prediction mode of a current block to subblocks obtained by splitting the current block performed by a video decoding apparatus. The method comprises decoding the size and an intra prediction mode of the current block. The method also comprises generating a pre-prunable range of the subblocks based on the size of the current block and the number of partitioned subblocks. Here, the pre-prunable range includes a vertical pre-prunable range and a horizontal pre-prunable range and represents a set of intra prediction directions in which constructed samples of newly reconstructed neighboring subblocks are not used by the subblocks when prediction is performed. The method also comprises setting a splitting direction of the subblocks according to whether the intra prediction mode is included in the vertical pre-prunable range or the horizontal pre-prunable range.

Another aspect of the present disclosure provides a video decoding apparatus applying an intra prediction mode of a current block to subblocks obtained by splitting the current block. The apparatus comprises an entropy decoder configured to decode the size and an intra prediction mode of the current block. The apparatus also comprises a pre-prunable range generator configured to generate a pre-prunable range of the subblocks based on the size of the current block. Here, the pre-prunable range includes a vertical pre-prunable range and a horizontal pre-prunable range and represents a set of intra prediction directions in which constructed samples of newly reconstructed neighboring subblocks are not used by the subblocks when prediction is performed. The apparatus also comprises an intra predictor configured to set a splitting direction of the subblocks according to whether the intra prediction mode is included in the vertical pre-prunable range or the horizontal pre-prunable range.

Yet another aspect of the present disclosure provides an intra prediction method for applying an intra prediction mode of a current block to subblocks obtained by splitting the current block performed by a video encoding apparatus. The method comprises obtaining the size and an intra prediction mode of the current block. The method also comprises generating a pre-prunable range of the subblocks based on the size of the current block. Here, the pre-prunable range includes a vertical pre-prunable range and a horizontal pre-prunable range and represents a set of intra prediction directions in which constructed samples of newly reconstructed neighboring subblocks are not used by the subblocks when prediction is performed. The method also comprises setting a splitting direction of the subblocks according to whether the intra prediction mode is included in the vertical pre-prunable range or the horizontal pre-prunable range.

As described above, the present embodiment provides a video encoding/decoding method and an apparatus that selectively encode and decode a splitting direction of a subblock. Thus, the video encoding/decoding method and apparatus may reduce the overhead of signal transmission for using subblock partitioning while effectively performing intra prediction per subblock basis.

DETAILED DESCRIPTION

Figure 1:
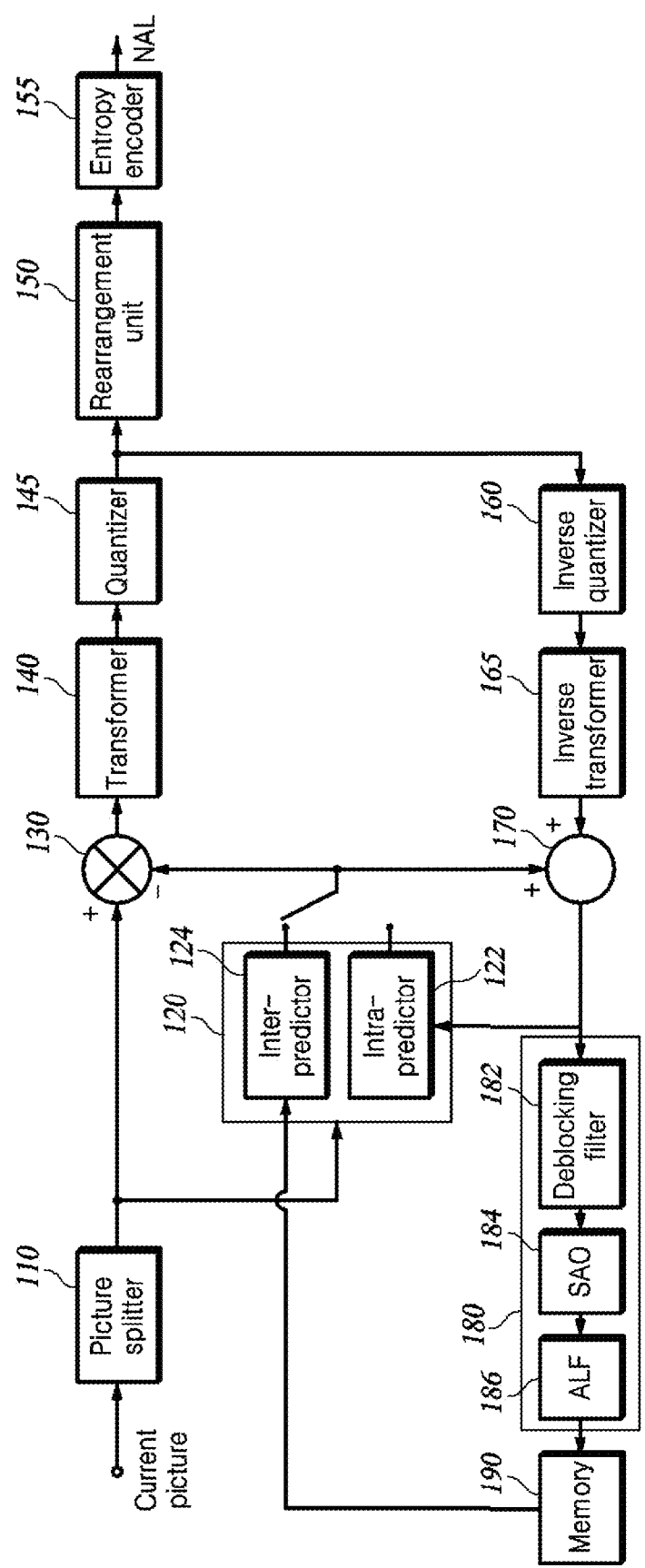
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, a detailed description of related known components and functions when considered to obscure the subject of the present disclosure has been omitted for the purpose of clarity and for brevity.

FIG. 1 is a block diagram for a video encoding apparatus, which may implement technologies of the present disclosure. Hereinafter, referring to illustration of FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a CTU. Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
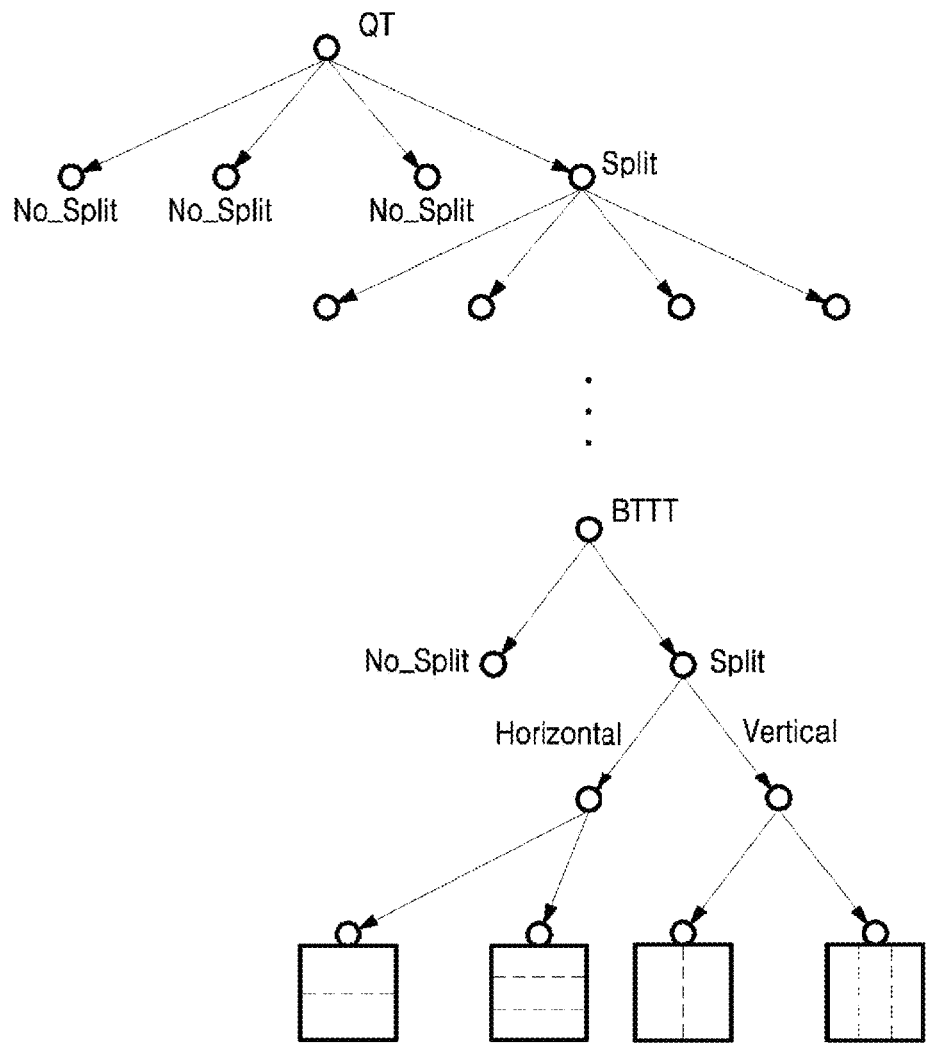
FIG. 2 illustrates a method for partitioning a block using a quadtree plus binarytree ternary tree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
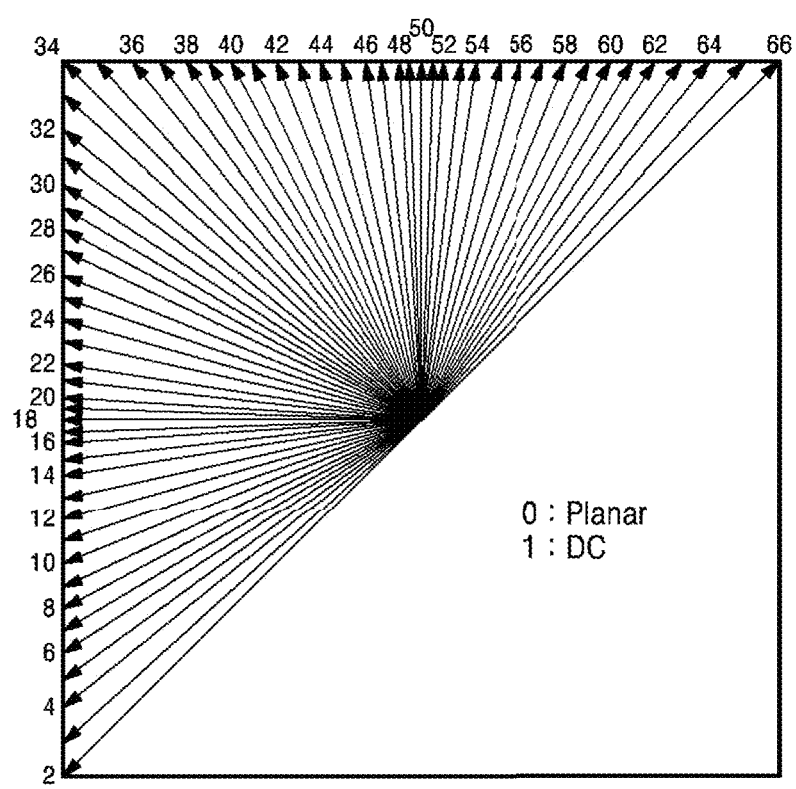
FIGS. 3A and 3B illustrate a plurality of intra prediction modes including wide-angle intra prediction modes.

The intra predictor 122 predicts pixels in the current block by using pixels (reference pixels) positioned on a neighboring of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
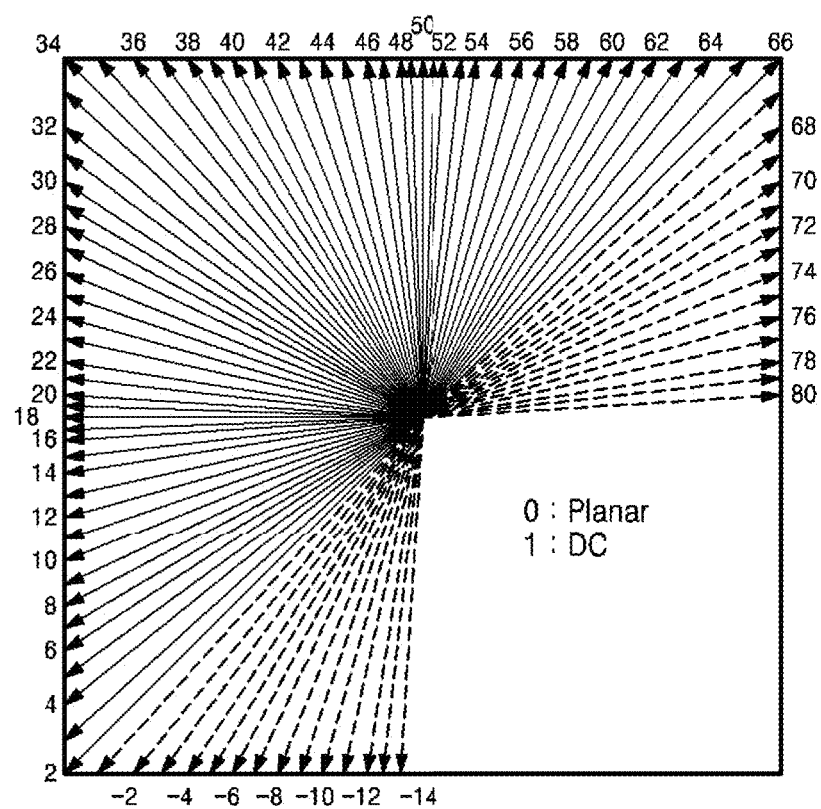

For efficient directional prediction for the current block having the rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefpicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
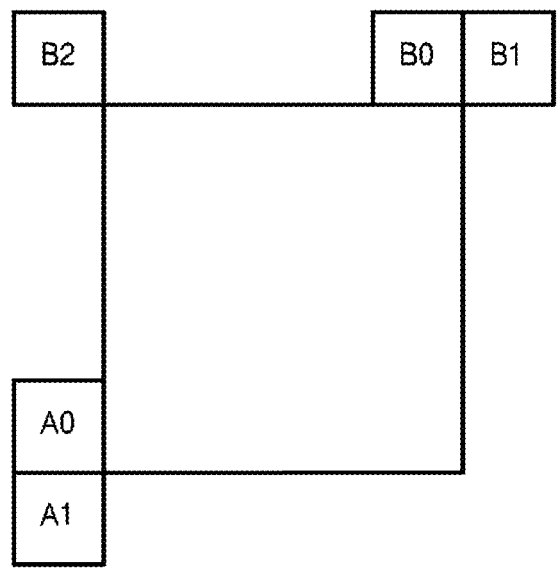
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate.

For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereafter, the merge mode and the merge skip mode are collectively called the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of subblocks and perform the transform by using the subblock as the transform unit. Alternatively, the residual block is divided into two subblocks, which are a transform area and a non-transform area to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
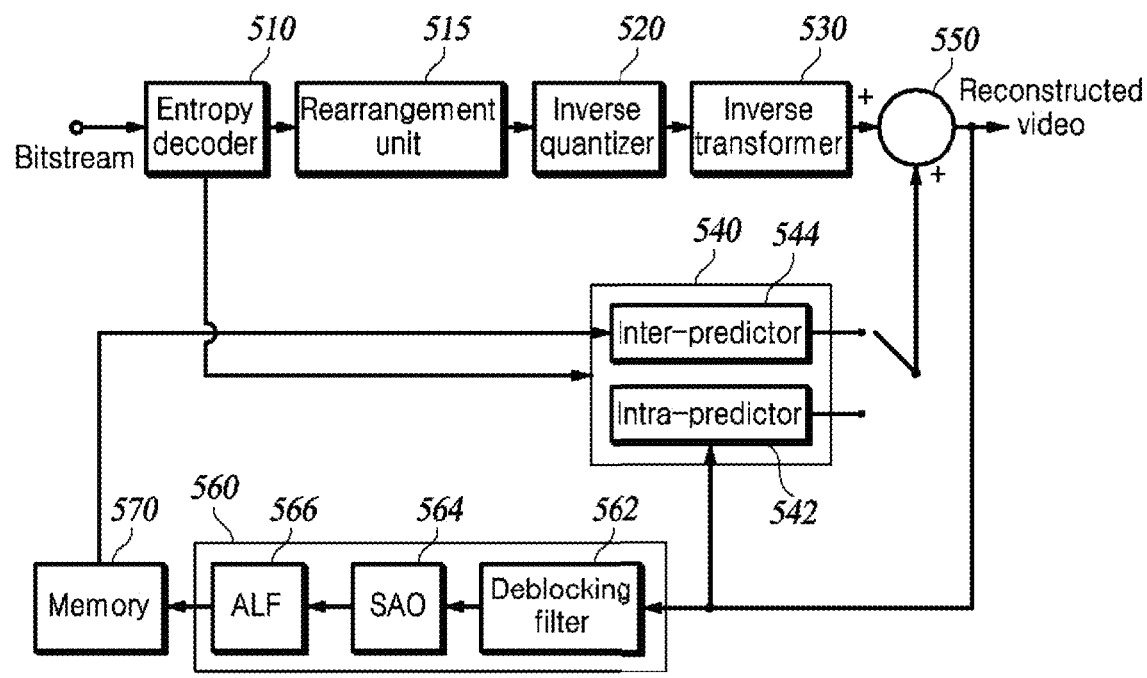
FIG. 5 is a block diagram of a video decoding apparatus that may implement the techniques of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information, and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present embodiment relates to encoding and decoding of an image (video) described above. More specifically, the present embodiment provides a video encoding/decoding method and an apparatus for selectively encoding and decoding a splitting direction of a subblock to reduce the overhead of signal transmission for using subblock partitioning while efficiently performing intra prediction per subblock basis.

The video encoding/decoding method according to the present embodiment may be performed by an intra predictor 122 of a video encoding apparatus and an intra predictor 542 of a video decoding apparatus.

Also, the aspect ratio of a block is defined as a value obtained by dividing the horizontal length of a block by the vertical length thereof.

I. Intra Prediction and Intra Sub-Partition (ISP)

In the VVC technology, an intra prediction mode of a luma block has fine-divided directional modes (i.e., 14 to 80) in addition to the non-directional mode (i.e., Planar and DC), as illustrated in FIGS. 3A and 3B. Based on the prediction mode, there are several techniques available to improve the coding efficiency of intra prediction. After subpartitioning a current block into small blocks of the same size, the ISP technique shares an intra prediction mode among all subblocks. However, the ISP technique may apply a transform to each subblock. Here, subpartitioning of a block may be performed in a horizontal or vertical direction.

Figure 6:
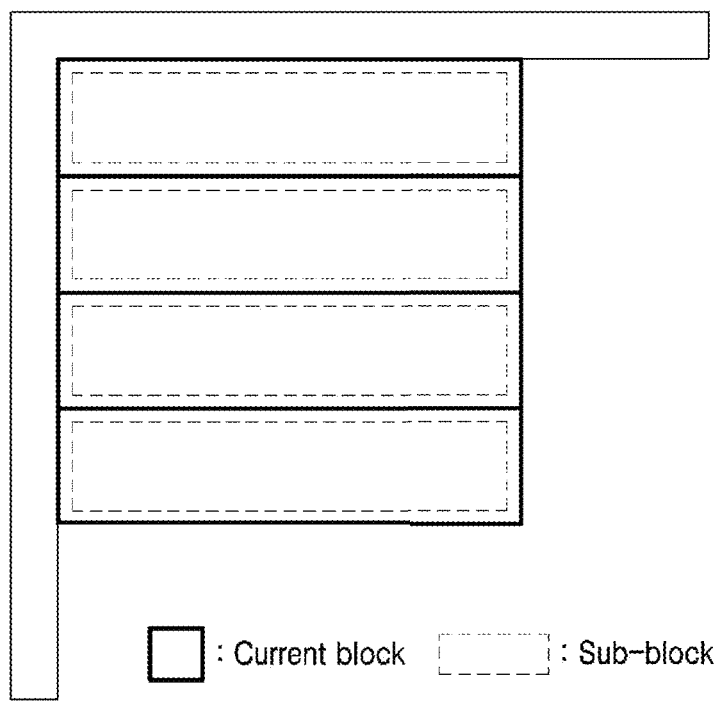
FIG. 6 shows a current block and subpartitioned subblocks.

In the following description, as shown in FIG. 6, a large block before being subpartitioned is referred to as a current block, and each subpartitioned small block is referred to as a subblock.

The ISP technique operates as follows.

The video encoding apparatus signals intra_subpartitions_mode_flag indicating whether ISP is applied and intra_subpartitions_split_flag indicating a subpartitioning method to the video decoding apparatus. Splitting types for subpartitions, IntraSubPartitionsSplitType, according to intra_subpartitions_mode_flag and intra_subpartitions_split_flag are shows in Table 1.

TABLE 1

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The ISP technique sets the splitting type IntraSubPartitionsSplitType as follows.

Figure 7A:
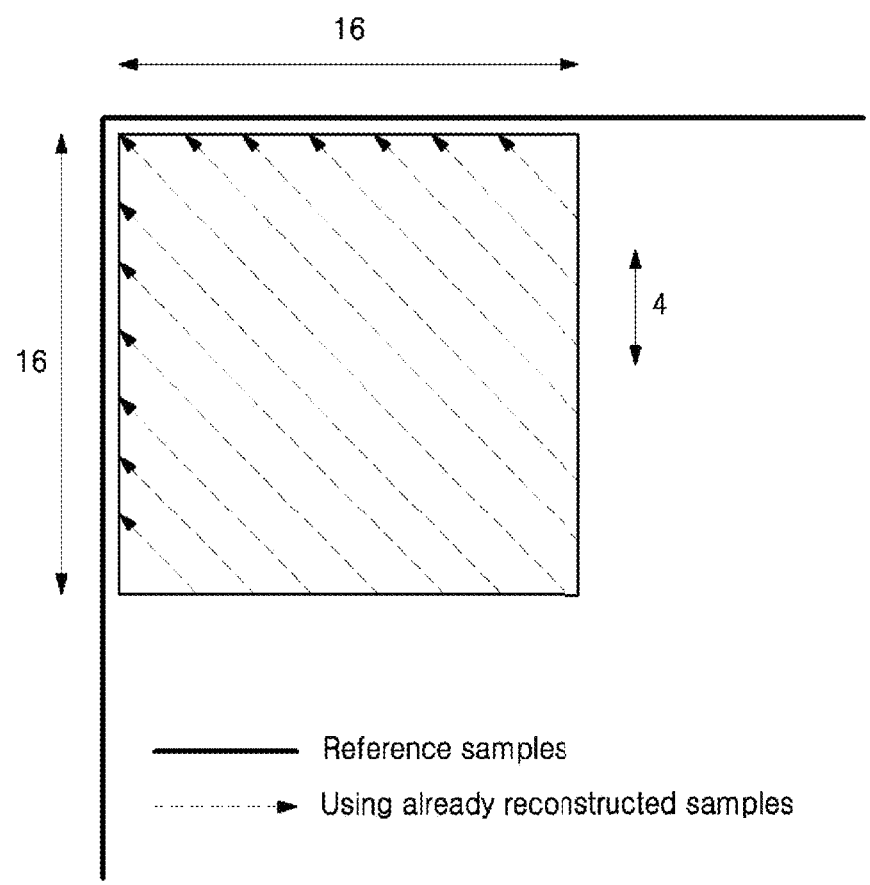
FIGS. 7A-7C illustrate subblock non-partitioning, horizontal partitioning, and vertical partitioning.

When intra_subpartitions_mode_flag is 0, IntraSubPartitionsSplitType is set to 0, and subblock splitting is not performed, as shown in the example of FIG. 7A. In other words. ISP is not applied.

If intra_subpartitions_mode_flag is not 0, ISP is applied. Here, IntraSubPartitionsSplitType is set to a value of 1+intra_subpartitions_split_flag, and subblock splitting is performed according to the splitting type. If IntraSubPartitionsSplitType=1, horizontal subblock splitting (ISP_HOR_SPLIT) is performed, and if IntraSubPartitionsSplitType=2, subblock splitting is performed in the vertical direction (ISP_VER_SPLIT). In other words, intra_subpartitions_split_flag may indicate the direction of subblock splitting.

For example, when an ISP mode in which a block is subpartitioned in the horizontal direction is applied to the current block, IntraSubPartitionsSplitType is 1, intra_subpartitions_mode_flag is 1, and intra_subpartitions_split_flag is 0.

In the following description, intra_subpartitions_mode_flag is called a subblock splitting application flag, intra_subpartitions_split_flag is called a subblock splitting direction flag, and IntraSubPartitionsSplitType is called a subblock splitting type.

Also, ISP_HOR_SPLIT is used interchangeably with horizontal splitting, and ISP_VER_SPLIT is used interchangeably with vertical splitting.

When a current block is split horizontally or vertically, ISP application may be limited according to the current block's size during splitting to prevent too small blocks from being split. In other words, when the current block size is 4×4, ISP is not applied. A block with a size of 4×8 or 8×4 may be split into two subblocks of the same shape and size, which is called Half_Split. Blocks of other sizes may be split into four subblocks of the same shape and size, which is called Quarter_Split.

Figure 7B:
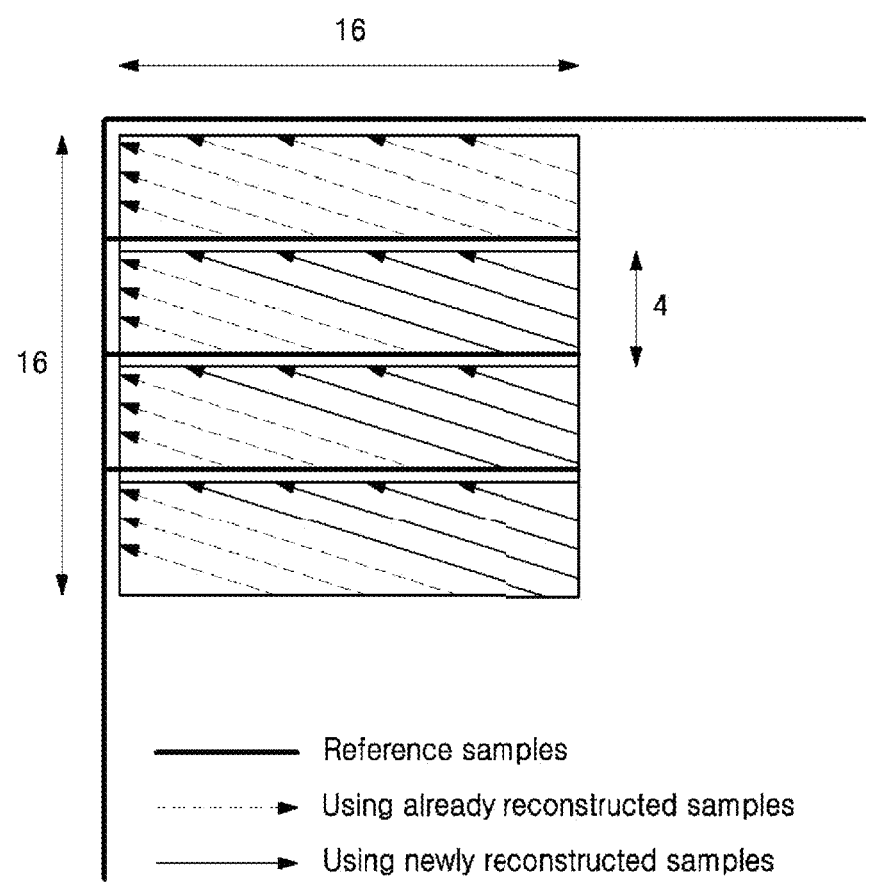
Figure 7C:
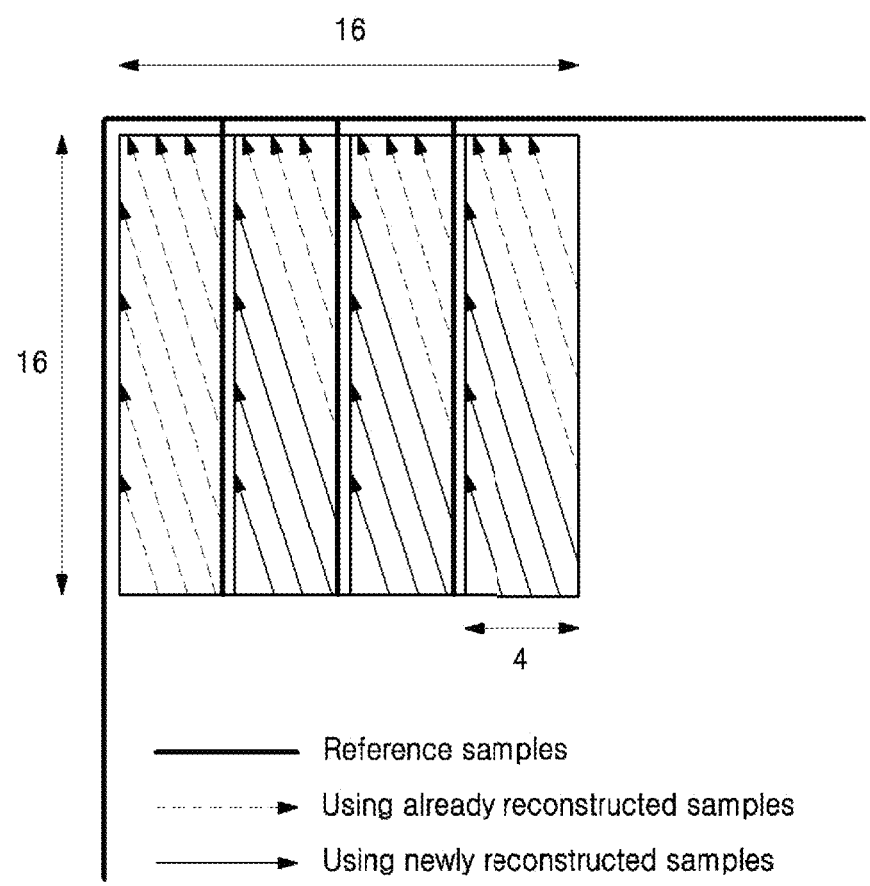

The video encoding apparatus sequentially encodes each subblock. Here, each subblock shares the same intra prediction information. In intra prediction for encoding each subblock, like the horizontal partitioning shown in FIG. 7B and the vertical partitioning shown in FIG. 7C, the video encoding apparatus may increase compression efficiency by using reconstructed pixels in a previously encoded subblock as predicted pixel values of a subsequent subblock.

However, as described above, the existing method of splitting one block into a plurality of subblocks but sharing one prediction mode among the subblocks exhibits an efficiency issue in some respects. For example, it is assumed that a current block is partitioned in a specific direction (e.g., vertical direction) according to an intra prediction mode (e.g., a mode predicted in the vertical direction) when intra prediction is applied to each subblock. In this case, there occurs a case in which reconstructed reference pixels in spatially neighboring subblocks are not employed due to a specific property of a given intra prediction direction. In this case, even if the ISP technology is used, the video decoding apparatus may not exploit the advantage of the ISP technique employing spatially more adjacent pixels. Nevertheless, if the video encoding apparatus still signals the application of the ISP technique, the signaling indicates horizontal partitioning is applied rather than vertical partitioning in the above example. Accordingly, in many cases, the video decoding apparatus may unambiguously determine in which direction subblocks are partitioned between the vertical and horizontal directions according to the intra prediction mode. However, since the existing methods always transmit the subblock splitting direction flag intra_subpartitions_split_flag to the video decoding apparatus to indicate the splitting direction, the ISP technique may not be fully optimized for intra prediction, which may limit the efficiency and advantages of the ISP technique.

II. Selective Encoding of Splitting Direction of Subblocks

In the present disclosure, to increase the efficiency of the ISP technique and maximize the benefits thereof, when the ISP technique is applied, the video encoding apparatus does not always transmit a subblock splitting direction flag intra_subpartitions_split_flag indicating whether to split horizontally or vertically. Instead, the intra_subpartitions_split_flag is transmitted only when the video decoding apparatus is unable to determine the subblock splitting direction on its own. In other words, when the video decoding apparatus is able to determine the subblock splitting direction on its own, the video encoding apparatus does not signal the subblock splitting direction. Instead, the video decoding apparatus determines the subblock splitting direction on its own and uses the determined subblock splitting direction for decoding.

In the following description, an embodiment according to the present disclosure is described from the viewpoint of the intra predictor 122 within the video encoding apparatus.

When performing intra prediction in units of partitioned subblocks, the video encoding apparatus may set a pre-prunable range pre_prunable_range. The pre-prunable range pre_prunable_range is a subset of intra prediction modes and includes intra prediction directions that do not use reconstructed samples of newly reconstructed neighboring subblocks when the ISP technique is applied to a subblock. Therefore, even if a current block is split into subblocks using the ISP technique, when prediction is performed in an intra prediction direction belonging to the pre_prunable_range, the video encoding apparatus does not refer to pixel values of previously reconstructed subblocks constituting the current block. Instead, the video encoding apparatus performs intra prediction using neighboring pixels of the current block, which may be distant from the current block. In other words, in this case, an advantageous feature of the ISP technique of splitting a current block and performing prediction using closer reference samples is not utilized. This is because the intra prediction direction prevents the utilization of the above feature. For example, if the intra prediction mode indicates the vertical direction and subblocks are split vertically, utilization of previously encoded subblocks is not required at all. Here, the intra prediction mode indicating the vertical direction belongs to pre_prunable_range when subblocks are split vertically split (i.e., in the case of ISP_VER_SPLIT).

As shown below, the pre-prunable range pre_prunable_range may be set in advance for each splitting direction of subblocks. First, with reference to FIGS. 8A, 8B, and 8C, a method for generating a pre-prunable range pre_prunable_range when a current block is split vertically is described.

Figure 8A:
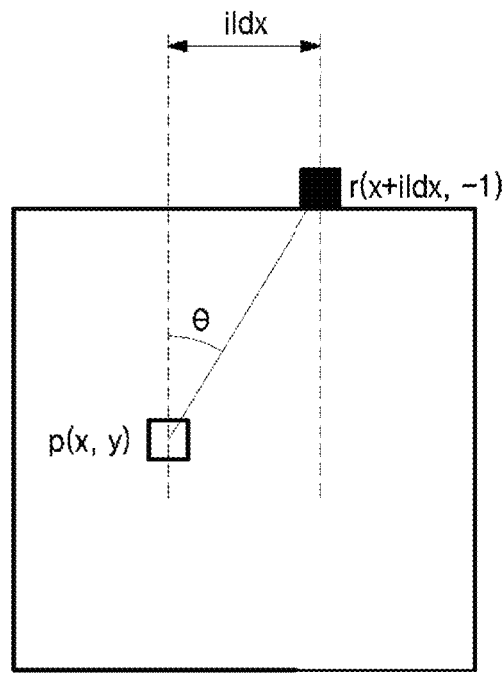
FIGS. 8A-8F illustrate a method for inducing pre_prunable_range according to one embodiment of the present disclosure.

In the example of FIG. 8A, θ represents the angle between the vertical line and a line passing through an arbitrary pixel p(x, y) in the current block and a reference sample r(x+iIdx,−1). Also, Table 2 specifies the mapping between predModeIntra and the angle parameter intraPredAngle.

TABLE 2

| predModeIntra | −14 | −13 | −12 | −11 | −10 | −9 | −8 | −7 | −6 | −5 | −4 | −3 |
|---|---|---|---|---|---|---|---|---|---|---|---|---|
| intraPredAngle | 512 | 341 | 256 | 171 | 128 | 102 | 86 | 73 | 64 | 57 | 51 | 45 |
| predModeIntra | −2 | −1 | 2 | 3 | 4 | 5 | 6 | 7 | 8 | 9 | 10 | 11 |
| intraPredAngle | 39 | 35 | 32 | 29 | 26 | 23 | 20 | 18 | 16 | 14 | 12 | 10 |
| predModeIntra | 12 | 13 | 14 | 15 | 16 | 17 | 18 | 19 | 20 | 21 | 22 | 23 |
| intraPredAngle | 8 | 6 | 4 | 3 | 2 | 1 | 0 | −1 | −2 | −3 | −4 | −6 |
| predModeIntra | 24 | 25 | 26 | 27 | 28 | 29 | 30 | 31 | 32 | 33 | 34 | 35 |
| intraPredAngle | −8 | −10 | −12 | −14 | −16 | −18 | −20 | −23 | −26 | −29 | −32 | −29 |
| predModeIntra | 36 | 37 | 38 | 39 | 40 | 41 | 42 | 43 | 44 | 45 | 46 | 47 |
| intraPredAngle | −26 | −23 | −20 | −18 | −16 | −14 | −12 | −10 | −8 | −6 | −4 | −3 |
| predModeIntra | 48 | 49 | 50 | 51 | 52 | 53 | 54 | 55 | 56 | 57 | 58 | 59 |
| intraPredAngle | −2 | −1 | 0 | 1 | 2 | 3 | 4 | 6 | 8 | 10 | 12 | 14 |
| predModeIntra | 60 | 61 | 62 | 63 | 64 | 65 | 66 | 67 | 68 | 69 | 70 | 71 |
| intraPredAngle | 16 | 18 | 20 | 23 | 26 | 29 | 32 | 35 | 39 | 45 | 51 | 57 |
| predModeIntra | 72 | 73 | 74 | 75 | 76 | 77 | 78 | 79 | 80 | | | |
| intraPredAngle | 64 | 73 | 86 | 102 | 128 | 171 | 256 | 341 | 512 | | | |

Here, intraPredAngle is a value with 1/32 pixel accuracy.

Also, iIdx shown in FIG. 8A is calculated as shown in Equation 1 using a bit shift operation to reduce computational complexity.

$$iIdx=((y+1)\cdot intraPredAnge)>>5 \qquad \text{Equation 2}$$

In the example of FIG. 8A, the tangent at the angle θ may be expressed by Equation 2.

$$\tan\theta = \frac{iIdx}{y+1} \qquad \text{Equation 2}$$

Therefore, the tangent value at the angle θ may be approximated by Equation 3 from Equations 1 and 2.

$$\tan\theta \approx \frac{intraPredAngle}{N} \qquad \text{Equation 3}$$

Figure 8B:
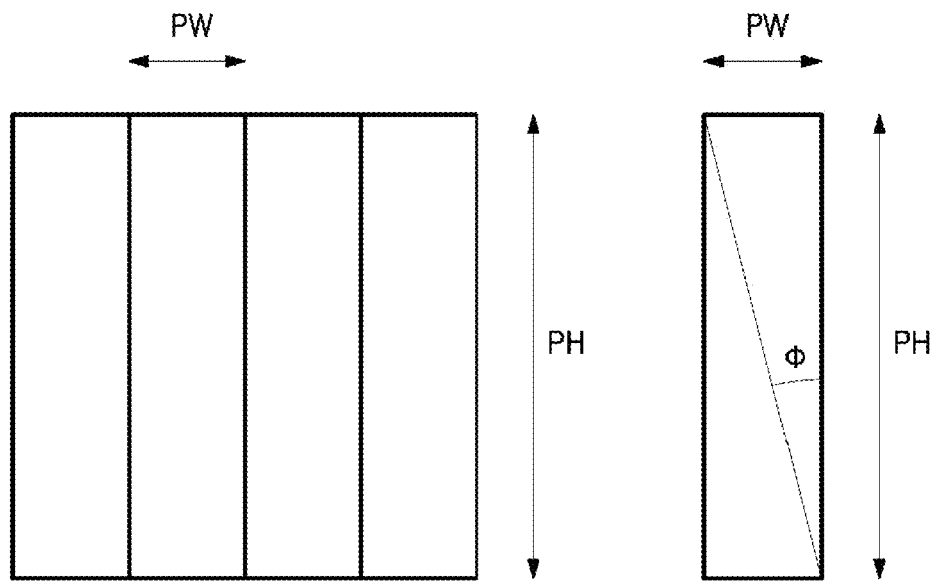

Meanwhile, as shown in FIG. 8B, suppose that a current block is split in the vertical direction, and the size of a subblock is PW×PH. PW and PH represent the horizontal and vertical lengths of a partitioned subblock, respectively. As shown in FIG. 8B, if the angle between the vertical line and the top left diagonal line of the subblock is expressed as φ, the tangent at the angle φ may be expressed by Equation 4.

$$\tan\phi = \frac{PW}{PH} \qquad \text{Equation 4}$$

All pixels above the top left diagonal line do not use the newly reconstructed reference samples. In other words, when the intra-prediction direction is greater than the prediction direction corresponding to the top left diagonal line, more than half of the pixels included in the subblock do not use the newly reconstructed reference samples. The case in which half of the pixels use the newly reconstructed reference samples occurs when the intra prediction direction is the same as the top left diagonal direction of the subblock. Based on the above observation, by making φ equal to θ, the starting direction of pre_prunable_range may be found. In other words, Equations 5 and 6 may be derived from Equations 3 and 4.

$$\frac{PW}{PH} = \frac{intraPredAngle}{N} \qquad \text{Equation 5}$$

$$intraPredAngle = N \cdot \frac{PW}{PH} \qquad \text{Equation 6}$$

Meanwhile, in Equations 3, 5, and 6, N represents interpolation accuracy, where one embodiment of this value is 32.

Figure 8C:
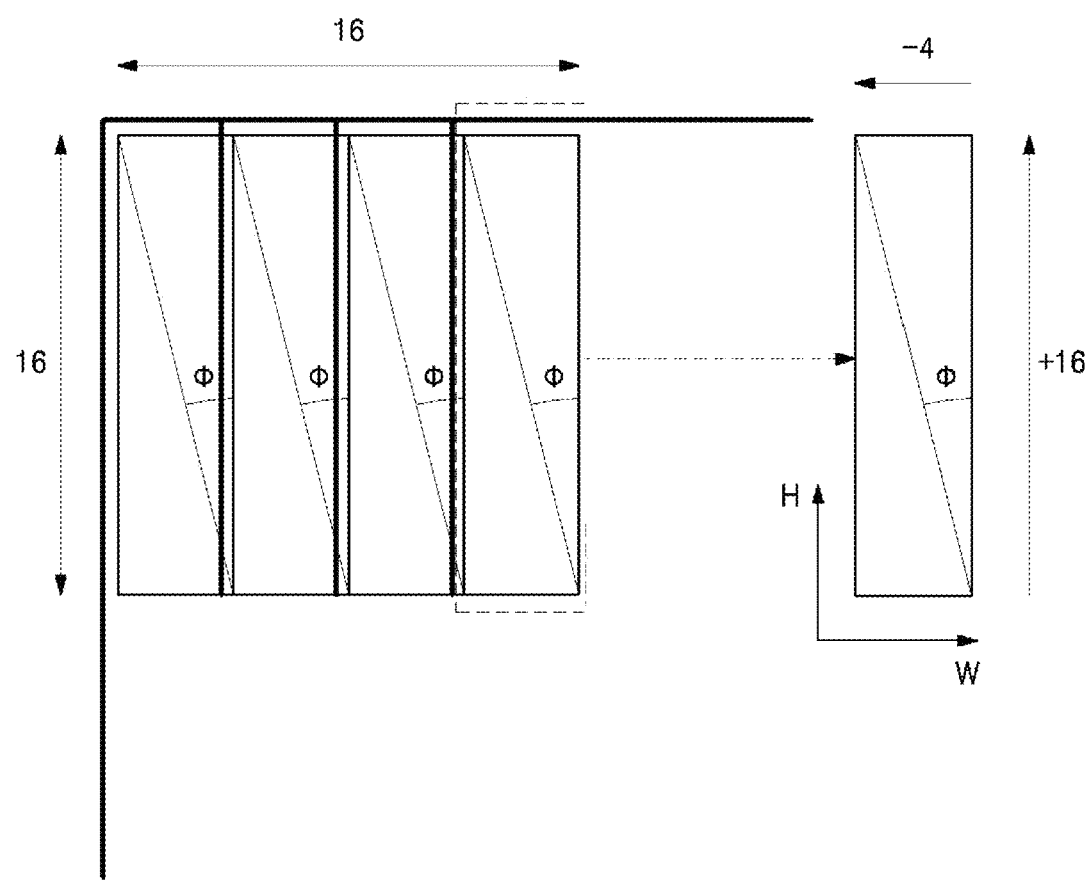

For example, in the example of FIG. 8C, the current block is a 16×16 luma CU block. According to Equation 6, intraPredAngle is calculated as −8, and referring to Table 2, predModeIntra corresponding to intraPredAngle −8 is intra prediction mode 44. When determining whether to apply the ISP mode to the current block, since modes greater than 44 in ISP_VER_SPLIT indicating the splitting direction for subblocks is vertical direction are included in pre_prunable_range, the video encoding apparatus may determine ISP_HOR_SPLIT without considering ISP_VER_SPLIT at the time of encoding. Accordingly, in this case, the subblock splitting direction flag intra_subpartitions_split_flag indicating the subblock splitting direction does not have to be signaled.

Figure 8D:
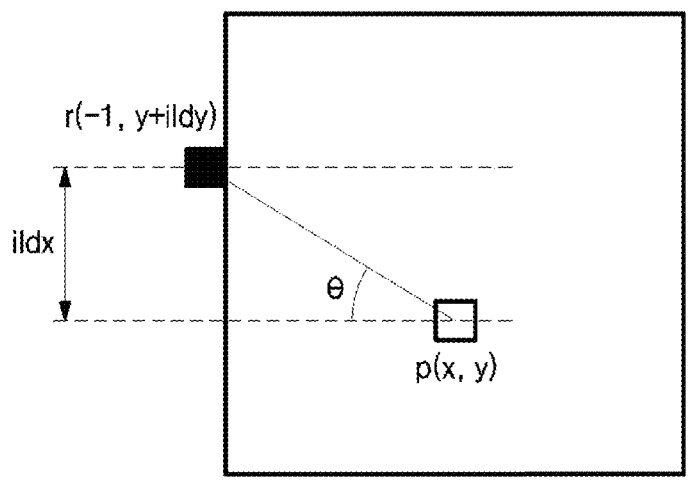
Figure 8E:
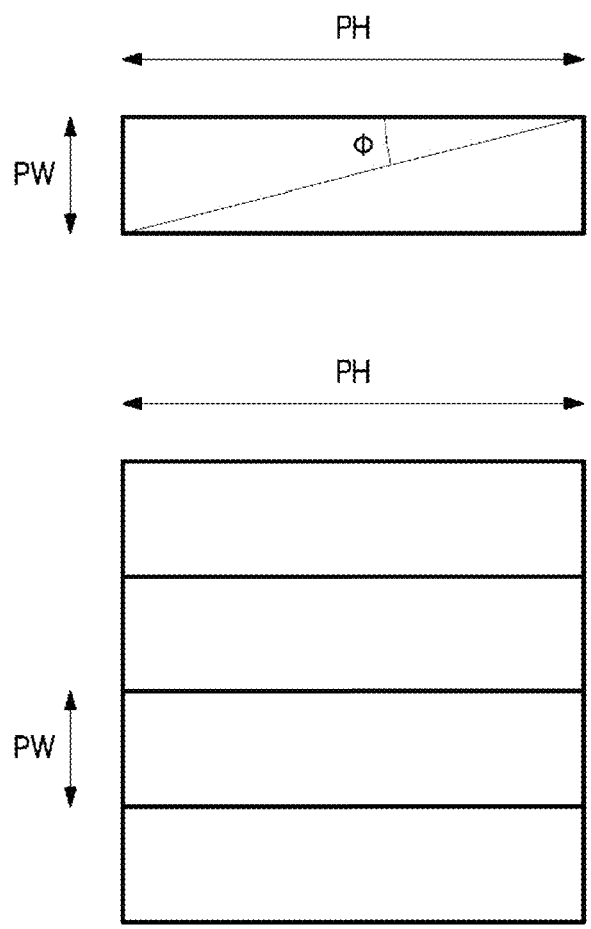
Figure 8F:
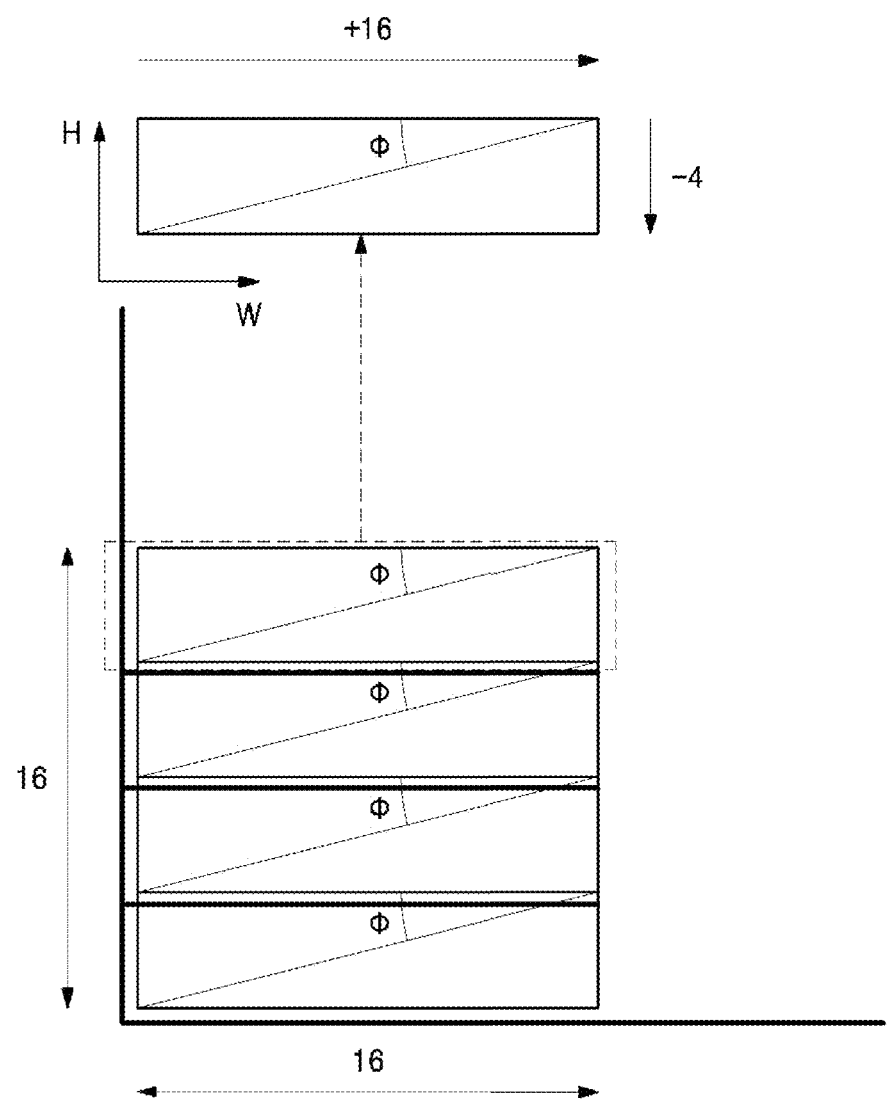

Next, with reference to FIGS. 8D, 8E, and 8F, a method for generating a pre-prunable range pre_prunable_range when a current block is horizontally split is described.

In the example of FIG. 8D, θ represents the angle between the horizontal line and a line passing through an arbitrary pixel p(x, y) in the current block and a reference sample r(−1,y+iIdy). Also, iIdy is calculated by Equation 7 with reference to Table 2.

$$iIdy=((x+1)\cdot intraPredAngle)>>5 \qquad \text{Equation 7}$$

In the example of FIG. 8D, the tangent value at the angle θ may be expressed by Equation 8.

$$\tan\theta = \frac{iIdy}{x+1} \qquad \text{Equation 8}$$

Therefore, the tangent value at the angle θ may be approximated by Equation 3 from Equations 7 and 8.

As shown in FIG. 8E, if the angle between the horizontal line and the top left diagonal line of the subblock is expressed as φ, the tangent at the angle φ may be expressed by Equation 9.

$$\tan\phi = \frac{PH}{PW} \qquad \text{Equation 9}$$

Meanwhile, all pixels below the top left diagonal line do not use the newly reconstructed reference samples. The case in which half of the pixels use the newly reconstructed reference samples occurs when the intra prediction direction is the same as the top left diagonal direction of the subblock. Based on the above observation, by making φ equal to θ, the starting direction of pre_prunable_range may be found. In other words, Equation 10 may be derived from Equations 3 and 9.

$$intraPredAngle = N \cdot \frac{PH}{PW} \qquad \text{Equation 10}$$

As described above, N represents interpolation accuracy, where one embodiment of this value is 32.

For example, in the example of FIG. 8F, the current block is a 16×16 luma CU block. According to Eq. 6, intraPredAngle is calculated as −8, and referring to Table 2, predModeIntra corresponding to intraPredAngle −8 is intra prediction mode 24. When determining whether to apply the ISP mode to the current block, since modes smaller than 24 in ISP_HOR_SPLIT indicating that the splitting direction for subblocks is horizontal direction are included in pre_prunable_range, the video encoding apparatus may determine ISP_VER_SPLIT without considering ISP_HOR_SPLIT at the time of encoding. Accordingly, in this case, the subblock splitting direction flag intra_subpartitions_split_flag indicating the subblock splitting direction does not have to be signaled.

Given a subblock's horizontal and vertical lengths, an angle between the top left diagonal line and the horizontal line or an angle between the top left diagonal line and the vertical line is defined. Therefore, according to the splitting direction, pre_prunable_range may be determined differently for each of the vertical splitting ISP_VER_SPLIT and the horizontal splitting ISP_HOR_SPLIT. As shown in the examples of FIGS. 9A and 9B, the pre_prunable_range may be defined as a vertical pre-prunable range pre_prunable_range_VER and a horizontal pre-prunable range pre_prunable_range_HOR.

Figure 9A:
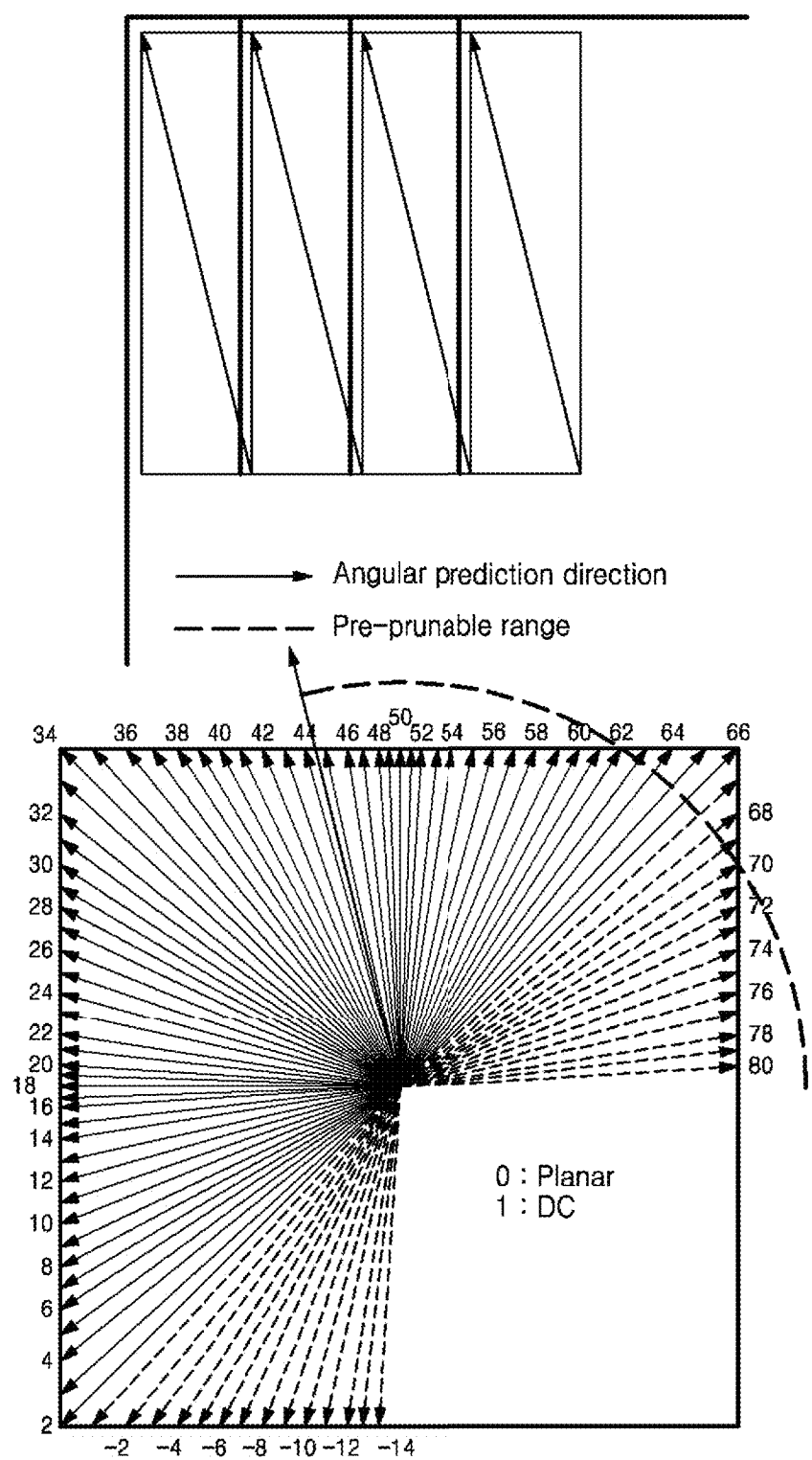
FIGS. 9A and 9B illustrate pre_prunable_range_VER and pre_prunable_range_HOR according to one embodiment of the present disclosure.
Figure 9B:
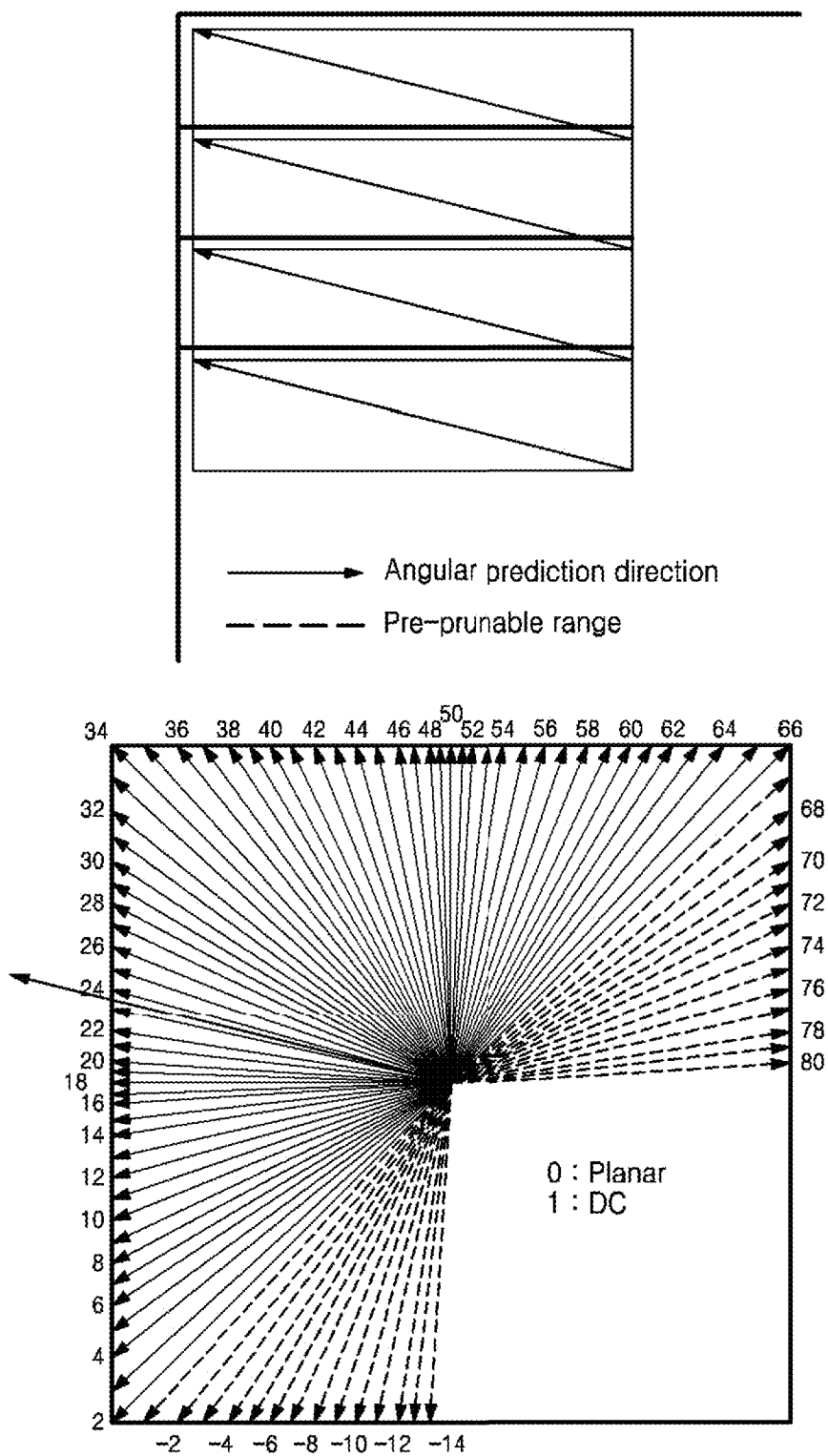

As shown in the example of FIG. 9A, in the case of vertical splitting, pre_prunable_range_VER includes values larger than the prediction direction corresponding to the top left diagonal line of a subblock. Meanwhile, as shown in FIG. 9B, in the case of horizontal splitting, pre_prunable_range_HOR may include values smaller than the prediction direction corresponding to the top left diagonal line of a subblock.

Suppose the technique according to the present embodiment is applied to VVC; in this case, the pre_prunable_range may be determined as shown in Table 3, considering the aspect ratio of a current block, the number of subpartitioned blocks, and the splitting direction.

TABLE 3

| Aspect ratio | ISP_HOIR_SPLIT | | ISP_VER_SPLIT | |
|---|---|---|---|---|
| (W/H) | Half split | Quarter split | Half split | Quarter split |
| 1/8 | X < 44 | X < 40 | 48 < X | 49 < X |
| 1/4 | X < 40 | X < 34 | 46 < X | 48 < X |
| 1/2 | X < 34 | X < 28 | 44 < X | 46 < X |
| 1 | X < 28 | X < 24 | 40 < X | 44 < X |

TABLE 3-continued

| Aspect ratio | ISP_HOR_SPLIT | | ISP_VER_SPLIT | |
| --- | --- | --- | --- | --- |
| (W/H) | Half split | Quarter split | Half split | Quarter split |
| 2 | X < 24 | X < 22 | 34 < X | 40 < X |
| 4 | X < 22 | X < 20 | 28 < X | 34 < X |
| 8 | X < 20 | X < 19 | 24 < X | 28 < X |

In Table 3, X represents an intra prediction mode.

Meanwhile, based on Table 3, pre_prunable_range may be expressed by Equation 11.

In the case of ISP_HOR_SPLIT, pre_prunable_range_HOR: $X1 \leq X < X2$

In the case of ISP_VER_SPLIT, pre_prunable_range_VER: $X1 < X \leq X2$

Equation 11

In Equation 11, X1 and X2 represent the lower and upper limits of pre_prunable_range, respectively.

Figure 10:
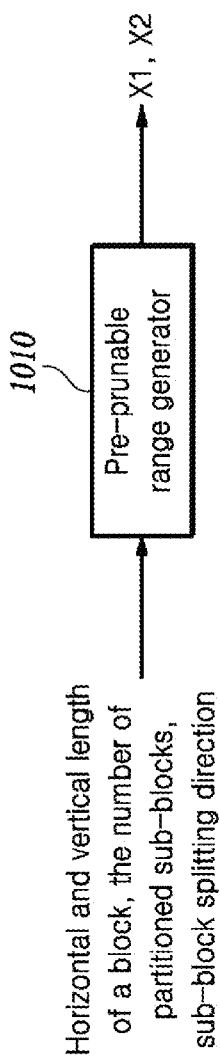
FIG. 10 is a block diagram conceptually illustrating a pre-prunable range generator according to one embodiment of the present disclosure.

FIG. 10 is a block diagram conceptually illustrating a pre-prunable range generator according to one embodiment of the present disclosure.

A pre-prunable range generator 1010 is included in the intra predictor 122 of the video encoding apparatus. The pre-prunable range generator 1010 may determine X1 and X2 according to Table 3 using the horizontal and vertical lengths of a subblock and the splitting direction of the subblock. If the pre_prunable_range is checked according to Table 3 after the aspect ratio of a current block is calculated from the horizontal and vertical lengths of the subblock while the splitting direction is fixed, the pre_prunable_range is the same regardless of the number of partitioned subblocks. For example, suppose the aspect ratio of a horizontally partitioned subblock is 4. If it is Half_Split, the aspect ratio of the current block is 2, and if it is Quarter_Split, the aspect ratio of the current block is 1. According to Table 3, it may be seen that 'X<24' in any case.

As another example of the present disclosure, the pre-prunable range generator 1010 may determine X1 and X2 according to Table 3 using the horizontal and vertical lengths of a current block before being split into subblocks, the number of subblocks, and the subblock splitting direction.

Meanwhile, information on the horizontal and vertical lengths of a current block or the horizontal and vertical lengths of a subblock may be replaced with the aspect ratio of the blocks. If an intra prediction mode X satisfies the corresponding condition of horizontal splitting or vertical splitting of Equation 11, the intra predictor 122 determines that the intra prediction mode X is included in the pre_prunable_range.

As described above, when the ISP technique is employed to split a block, to prevent the block from being split into too small blocks, a current block with a size of 4×8 or 8×4 is split into two subblocks (Half_Split), and a current block with a size larger than the above may be split into four subblocks (Quarter_Split). In other words, according to the existing ISP technique, the number of subblocks may be determined according to the size of the current block. In general, in case of Quarter_Split. X1 and X2 determined by the pre-prunable range generator 1010 according to Table 3 and Equation 11 are expressed as shown in Table 4. In case of Half_Split, X1 and X2 may be expressed as shown in Table 5.

TABLE 4

| Aspect ratio (W/H) | pre_prunable_range_HOR | pre_prunable_range_VER |
| --- | --- | --- |
| 1/8 | X1 = −14, X2 = 40 | X1 = 49, X2 = 80 |
| 1/4 | X1 = −14, X2 = 34 | X1 = 48, X2 = 80 |
| 1/2 | X1 = −14, X2 = 28 | X1 = 46, X2 = 80 |
| 1 | X1 = −14, X2 = 24 | X1 = 44, X2 = 80 |
| 2 | X1 = −14, X2 = 22 | X1 = 40, X2 = 80 |
| 4 | X1 = −14, X2 = 20 | X1 = 34, X2 = 80 |
| 8 | X1 = −14, X2 = 19 | X1 = 28, X2 = 80 |

TABLE 5

| Aspect ratio (W/H) | pre_prunable_range_HOR | pre_prunable_range_VER |
| --- | --- | --- |
| 1/8 | X1 = −14, X2 = 44 | X1 = 48, X2 = 80 |
| 1/4 | X1 = −14, X2 = 40 | X1 = 46, X2 = 80 |
| 1/2 | X1 = −14, X2 = 34 | X1 = 44, X2 = 80 |
| 1 | X1 = −14, X2 = 28 | X1 = 40, X2 = 80 |
| 2 | X1 = −14, X2 = 24 | X1 = 34, X2 = 80 |
| 4 | X1 = −14, X2 = 22 | X1 = 28, X2 = 80 |
| 8 | X1 = −14, X2 = 20 | X1 = 24, X2 = 80 |

In another embodiment of the present disclosure, the size of a block preventing the block from being split into subblocks may be set to a different value. For example, a current block may be split into subblocks so that the size of the block after splitting is not smaller than 8×8. As another embodiment, a current block may be split so that the size of a subblock is not smaller than 2×2 after the current block is split into subblocks.

Meanwhile, although the descriptions above illustrate the method for determining a pre-prunable range pre_prunable_range by the intra predictor 122 within the video encoding apparatus, the method may be applied the same for the intra predictor 542 of the video decoding apparatus. In other words, to determine the pre-prunable range pre_prunable_range, the intra predictor 542 may also include a pre-prunable generator.

In the following description, an intra prediction method including selective encoding of information that indicates a splitting direction of subblocks performed by the intra predictor 122 within the video encoding apparatus is described.

Figure 11:
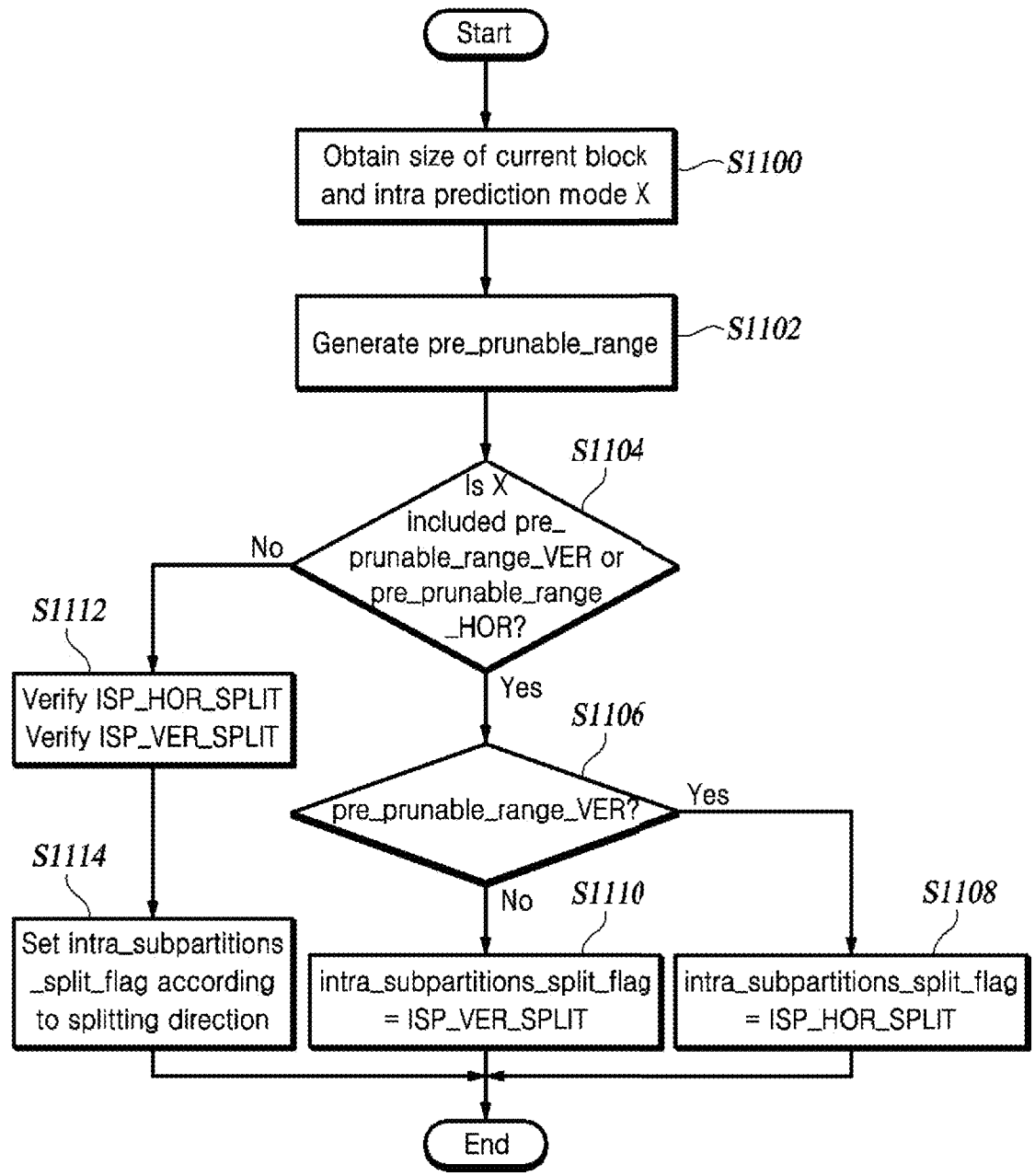
FIG. 11 is a flow diagram illustrating an intra prediction method including selective encoding of a subblock splitting direction according to one embodiment of the present disclosure.

FIG. 11 is a flow diagram illustrating an intra prediction method including selective encoding of a subblock splitting direction according to one embodiment of the present disclosure.

The video encoding apparatus obtains the size of a current block and an intra prediction mode X (S1100). Here, the size of the current block may be expressed by the horizontal and vertical lengths.

The video encoding apparatus generates a pre-prunable range pre_prunable_range of subblocks (S1102). Here, pre_prunable_range includes pre_prunable_range_VER and pre_prunable_range_HOR. The video encoding apparatus may generate pre_prunable_range_VER and pre_prunable_range_HOR according to Table 3 using the aspect ratio of the current block and the number of partitioned subblocks. Meanwhile, since the existing ISP technique is capable of determining the number of partitioned subblocks according to the size of the current block, it is not necessary to encode the number of partitioned subblocks.

As another example of the present disclosure, when the number of partitioned subblocks may not be determined according to the size of a current block, the video encoding apparatus obtains and encodes the number of partitioned subblocks and transmit the number of partitioned subblocks encoded to the video decoding apparatus.

The video encoding apparatus checks whether the intra prediction mode X of the current block is included in pre_prunable_range_VER or pre_prunable_range_HOR (S1104).

If the intra prediction mode X is included in at least one of the two ranges (Yes in S1004), the video encoding apparatus checks whether the intra prediction mode X of the current block is included in pre_prunable_range_VER (S1106).

When the intra prediction mode X of the current block is included in pre_prunable_range_VER (Yes in S1006), applying the corresponding intra mode to vertical splitting means that intra prediction is performed without using newly reconstructed neighboring prediction samples. This case represents the same case in which subblock splitting is not performed.

The video encoding apparatus sets intra_subpartitions_mode_flag=0 and first calculates the coding efficiency corresponding to the setting. Also, to use another encoding method, the video encoding apparatus sets intra_subpartitions_mode_flag=1 and sets the subblock splitting direction flag intra_subpartitions_split_flag to ISP_HOR_SPLIT, namely, to horizontal splitting (S1108) to calculate the coding efficiency. The video encoding apparatus may select and encode a better case between the cases of using and not using the ISP. Here, if the case of intra_subpartitions_mode_flag=0 yields a better result, the video encoding apparatus does not have to transmit the subblock splitting direction since ISP is not applied. Also, if the case of intra_subpartitions_mode_flag=1 is more advantageous, it is obvious that the subblock splitting direction is ISP_HOR_SPLIT, i.e., horizontal splitting. Therefore, in this case, too, the video encoding apparatus may not signal the intra_subpartitions_split_flag indicating the subblock splitting direction.

In the same way, when the intra prediction mode X of a current block is included in pre_prunable_range_HOR (No in S1006), applying the corresponding intra mode to horizontal splitting means that intra prediction is performed without using newly reconstructed neighboring prediction samples. Therefore, the video encoding apparatus sets intra_subpartitions_split_flag to ISP_VER_SPLIT to calculate encoding efficiency (S1110). In this case, since it is obvious that the subblock splitting direction is ISP_VER_SPLIT, namely, vertical splitting, the video encoding apparatus may not signal intra_subpartitions_split_flag indicating the subblock splitting direction.

Meanwhile, when the intra prediction mode X of a current block is not included in both pre_prunable_range_VER and pre_prunable_range_HOR (No in S1004), the video encoding apparatus may use a conventional method.

The video encoding apparatus performs ISP_HOR_SPLIT verification and ISP_VER_SPLIT verification (S1112). The video encoding apparatus may determine the splitting direction by using a process of examining the ISP subblock splitting directions horizontally and vertically.

The video encoding apparatus sets a value of intra_subpartitions_split_flag according to the determined splitting direction (S1114). As described above, when intra_subpartitions_split_flag=0, ISP_HOR_SPLIT is indicated; when intra_subpartitions_split_flag=1, ISP_VER_SPLIT is indicated. After encoding the intra_subpartitions_split_flag, the video encoding apparatus transmits a bitstream including the encoded intra_subpartitions_split_flag to the video decoding apparatus.

In the following description, an intra prediction method including selective decoding of information indicating a subblock splitting direction performed by the intra predictor 542 within the video decoding apparatus is described.

Figure 12:
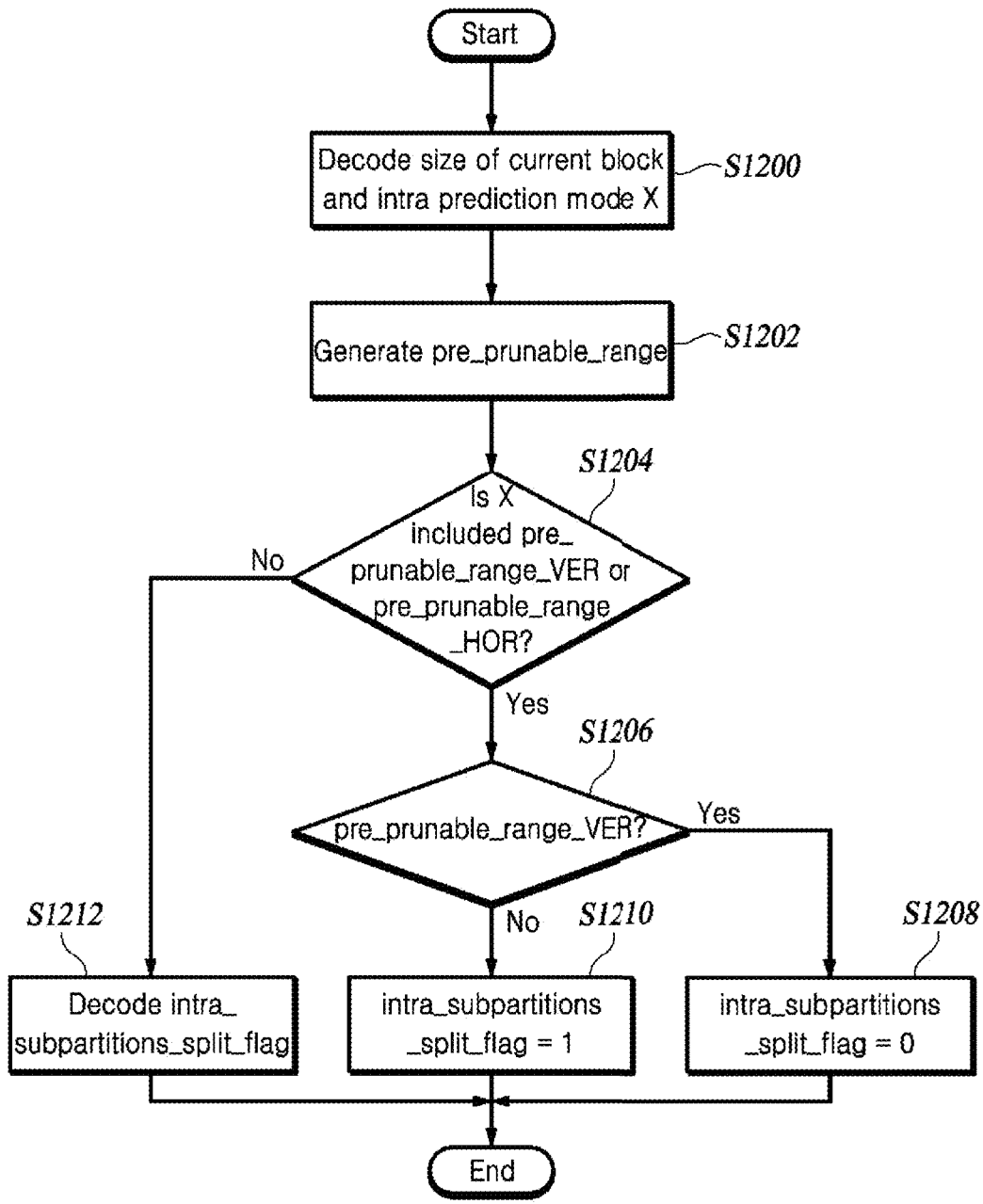
FIG. 12 is a flow diagram illustrating an intra prediction method including selective decoding of a subblock splitting direction according to one embodiment of the present disclosure.

FIG. 12 is a flow diagram illustrating an intra prediction method including selective decoding of a subblock splitting direction according to one embodiment of the present disclosure.

In the following description, it is assumed that the value of intra_subpartitions_mode_flag is signaled as 1 so that the video decoding apparatus performs ISP subblock splitting of a current block.

The entropy decoder 510 within the video decoding apparatus decodes the size of a current block and the intra prediction mode X (S1200). Here, the size of the current block may be represented by horizontal and vertical lengths.

The video decoding apparatus generates a pre-prunable range pre_prunable_range of subblocks (S1202). Here, pre_prunable_range includes pre_prunable_range_VER and pre_prunable_range_HOR. The video decoding apparatus may generate pre_prunable_range_VER and pre_prunable_range_HOR according to Table 3 using the aspect ratio of the current block and the number of partitioned subblocks. Meanwhile, since the video decoding apparatus may determine the number of partitioned subblocks according to the size of a current block using the existing ISP technique, decoding the number of partitioned subblocks is not required.

As another example of the present disclosure, when the number of partitioned subblocks may not be determined according to the size of a current block, the video decoding apparatus may decode the number of partitioned subblocks transmitted by the video encoding apparatus.

The video decoding apparatus checks whether the intra prediction mode X of the current block is included in pre_prunable_range_VER or pre_prunable_range_HOR (S1204).

If the intra prediction mode X is included in at least one of the two ranges (Yes in S1204), the video decoding apparatus checks whether the intra prediction mode X of the current block is included in pre_prunable_range_VER (S1206).

When the intra prediction mode X of the current block is included in pre_prunable_range_VER (Yes in S1206), as illustrated in detail in the description of the video encoding apparatus, the video decoding apparatus sets intra_subpartitions_split_flag to 0 without reading the value of the subblock splitting direction flag intra_subpartitions_split_flag (S1208). In other words, the video decoding apparatus may set the subblock splitting direction to ISP_HOR_SPLIT, indicating horizontal splitting.

In the same way, when the intra prediction mode X of the current block is included in pre_prunable_range_HOR (No in S1206), the video decoding apparatus sets intra_subpartitions_split_flag to 1 without separately reading the value of the subblock splitting direction flag intra_subpartitions_split_flag (S1210). In other words, the video decoding apparatus may set the subblock splitting direction to ISP_VER_SPLIT, indicating vertical splitting.

Meanwhile, when the intra prediction mode X of the current block is not included in both pre_prunable_range_VER and pre_prunable_range_HOR (No in S1204), the video decoding apparatus may set the splitting direction of subblocks by decoding the value of intra_subpartitions_split_flag that indicates the splitting direction of subblocks (S1212).

Although the steps in the respective flowcharts are described to be sequentially performed, the steps merely instantiate the technical idea of some embodiments of the present disclosure. Therefore, a person having ordinary skill in the pertinent art could perform the steps by changing the sequences described in the respective drawings or by performing two or more of the steps in parallel. Hence the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium includes, for example, all types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, one of ordinary skill should understand that the scope of the present disclosure is not to be limited by the above explicitly described embodiments but by the claims and equivalents thereof.

REFERENCE NUMERALS

122: intra predictor
510: entropy decoder
542: intra predictor
1010: pre-prunable range generator

What is claimed is:

1. An intra prediction method for applying an intra prediction mode of a current block to subblocks obtained by splitting the current block performed by a video decoding apparatus, the method comprising:
   decoding the size and an intra prediction mode of the current block;
   generating a pre-prunable range of the subblocks based on the size of the current block and the number of partitioned subblocks, wherein the pre-prunable range includes a vertical pre-prunable range and a horizontal pre-prunable range and represents a set of intra prediction directions in which constructed samples of newly reconstructed neighboring subblocks are not used by the subblocks when prediction is performed; and
   setting a splitting direction of the subblocks according to whether the intra prediction mode is included in the vertical pre-prunable range or the horizontal pre-prunable range.

2. The method of claim 1, wherein generating the pre-prunable range comprises determining the number of the partitioned sub blocks according to the size of the current block or using the predecoded number of subblocks.

3. The method of claim 1, wherein setting the splitting direction comprises setting the splitting direction of the subblocks to horizontal direction when the intra prediction mode is included in the vertical pre-prunable range.

4. The method of claim 1, wherein setting the splitting direction comprises setting the splitting direction of the subblocks to vertical direction when the intra prediction mode is included in the horizontal pre-prunable range.

5. The method of claim 1, wherein, when the intra prediction mode is not included in the pre-prunable range, setting the splitting direction comprises setting the splitting direction of the subblocks according to a subblock splitting direction flag after decoding the subblock splitting direction flag indicating the splitting direction of the sub blocks.

6. The method of claim 1, wherein the vertical pre-prunable range includes values greater than a prediction direction corresponding to the top left diagonal line of subblocks partitioned in the vertical direction.

7. The method of claim 1, wherein the horizontal pre-prunable range includes values smaller than a prediction direction corresponding to the top left diagonal line of subblocks partitioned in the horizontal direction.

8. An intra prediction method for applying an intra prediction mode of a current block to subblocks obtained by splitting the current block performed by a video encoding apparatus, the method comprising:
   obtaining the size and an intra prediction mode of the current block;
   generating a pre-prunable range of the subblocks based on the size of the current block, wherein the pre-prunable range includes a vertical pre-prunable range and a horizontal pre-prunable range and represents a set of intra prediction directions in which constructed samples of newly reconstructed neighboring subblocks are not used by the subblocks when prediction is performed; and
   setting a splitting direction of the sub blocks according to whether the intra prediction mode is included in the vertical pre-prunable range or the horizontal pre-prunable range.

9. The method of claim 8, wherein generating the pre-prunable range comprises determining the number of the partitioned sub blocks according to the size of the current block or using the number of sub blocks obtained previously.

10. The method of claim 8, wherein, when the intra prediction mode is included in the vertical pre-prunable range, setting the splitting direction comprises setting the splitting direction of the subblock to horizontal direction and not generating a subblock splitting direction flag indicating a splitting direction of the subblocks.

11. The method of claim 8, wherein, when the intra prediction mode is included in the horizontal pre-prunable range, setting the splitting direction comprises setting the splitting direction of the subblock to vertical direction and not generating a subblock splitting direction flag indicating a splitting direction of the sub blocks.

12. The method of claim 8, wherein, when the intra prediction mode is not included in the pre-prunable range, setting the splitting direction comprises:
   generating coding efficiency according to horizontal and vertical splitting of the current block; and setting a subblock splitting direction indicating the splitting direction of the subblocks based on the coding efficiency.

13. A non-transitory computer-readable recording medium storing a bitstream generated by a video encoding method for applying an intra prediction mode of a current block to subblocks obtained by splitting the current block, wherein the method comprises:

obtaining the size and an intra prediction mode of the current block;

generating a pre-prunable range of the subblocks based on the size of the current block, wherein the pre-prunable range includes a vertical pre-prunable range and a horizontal pre-prunable range and represents a set of intra prediction directions in which constructed samples of newly reconstructed neighboring subblocks are not used by the subblocks when prediction is performed; and setting a splitting direction of the subblocks according to whether the intra prediction mode is included in the vertical pre-prunable range or the horizontal pre-prunable range.

* * * * *